United States Patent
Landgraf

(10) Patent No.: US 9,547,302 B2
(45) Date of Patent: Jan. 17, 2017

(54) AUTOMATION SYSTEM AND METHOD FOR CLOCK TIME, PROCESS, AND/OR MACHINE OPTIMIZATION

(75) Inventor: Guenther Landgraf, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1930 days.

(21) Appl. No.: 11/832,011

(22) Filed: Aug. 1, 2007

(65) Prior Publication Data

US 2008/0052554 A1 Feb. 28, 2008

(30) Foreign Application Priority Data

Aug. 22, 2006 (DE) ........................ 10 2006 039 244

(51) Int. Cl.
 *G06F 1/14* (2006.01)
 *G05B 19/4155* (2006.01)

(52) U.S. Cl.
 CPC . *G05B 19/4155* (2013.01); *G05B 2219/36301* (2013.01)

(58) Field of Classification Search
 CPC ....................................................... G06F 1/14
 USPC .......................................................... 713/500
 See application file for complete search history.

(56) References Cited

U.S. PATENT DOCUMENTS

| | | | | |
|---|---|---|---|---|
| 4,310,878 A | * | 1/1982 | Hyatt | 700/78 |
| 5,483,468 A | * | 1/1996 | Chen et al. | 702/186 |
| 6,788,218 B2 | * | 9/2004 | Sudolcan | 340/870.16 |
| 6,993,695 B2 | * | 1/2006 | Rivoir | 714/734 |
| 7,453,910 B1 | * | 11/2008 | Biberstein et al. | 370/503 |
| 7,500,152 B2 | * | 3/2009 | Moyer et al. | 714/45 |
| 7,580,037 B1 | * | 8/2009 | Iotov | 345/440 |
| 8,090,972 B2 | * | 1/2012 | Bengtson | G05B 15/02 702/1 |
| 2004/0002778 A1 | * | 1/2004 | Giamona et al. | 700/61 |

* cited by examiner

*Primary Examiner* — Kim Huynh
*Assistant Examiner* — Eric Chang
(74) *Attorney, Agent, or Firm* — Maginot, Moore & Beck LLP

(57) ABSTRACT

Automation system with computerized numerical control includes at least two data processing levels, particularly a data block preparation level and a data block processing level, and a clock time-registering unit assigned to the particular data processing levels for registering clock times of subsystems in the particular data processing levels, and a unit for comparing the clock times—and relating them to each other in terms of time—registered for the particular data processing levels.

8 Claims, 3 Drawing Sheets

AUTOMATION SYSTEM AND METHOD FOR CLOCK TIME, PROCESS, AND/OR MACHINE OPTIMIZATION

CROSS-REFERENCE TO A RELATED APPLICATION

The invention described and claimed hereinbelow is also described in German Patent Application DE 10 2006 039 244.2 filed on Aug. 22, 2006. This German Patent Application, whose subject matter is incorporated here by reference, provides the basis for a claim of priority of invention under 35 U.S.C. 119(a)-(d).

BACKGROUND OF THE INVENTION

The present invention relates to an automation system and a method for clock time, process, and/or machine optimization.

A known problem associated with the design and start-up of automation systems is adhering to and/or optimizing the total clock time, with consideration for the clock times of individual processes in the various subsystems, such as Statistical Process Control (SPC), Numerical Control (NC), the drive, etc. Automation systems of this type typically generate data in different time domains and/or in various subsystems. The object is to optimize automation systems of this type by reducing the clock times; the overall process and subprocesses are included in this case.

Optimizations can also be realized in process and machine analysis. Since a block may refer to the process signals, e.g., the motor current, the tool should also support the user in terms of process optimizations, e.g., start of cut (by providing a safeguard against a rapid lurch by the tool, from the point of initial contact until full force has developed). The act of "machine optimization" starts at the point when the process can no longer be adequately controlled. If machine stiffness is not adequately ensured, e.g., for the work to be performed, or if impermissible fluctuations occur in various signals, e.g., the motor current, axle speed or positions, then design-related measures are often required, even if repeatedly optimizing the process parameters does not result in improvement.

Currently, the various subsystems of typical automation systems, e.g., SPC, NC or the drives, have their own specially-assigned analytical tools. However, there is no tool for computerized numerical control (CNC) that collects and/or displays data in a clock-synchronous manner in the various time domains. Nor are there any known tools that display the clock times at a higher level, or that provide—as needed—special data on the subsystems (e.g., the drive-side motor current or the state of an SPC flag), and/or a synchronous graphical simulation.

Conventional analytical tools are tailored to the special requirements of a system or individual subsystems, which makes a more general application—e.g., optimization of total clock time—difficult. For example, the oscilloscope function of a drive only considers the data on the drive, and it only offers special depictions of the data in this context. The data recorded there are stored with the times available there. These clocks are typically not synchronized with the clocks of other subsystems. The data are not actively related to the clock times of further subsystems or the higher-order, overall process, which is specified by the NC program.

Clock time-analysis tools are also known, with which data are collected on a programmable controller (PC) via a particular controller interface. The relevant data (e.g., current NC block or motor current) that are changed or downloaded from the controller in a cyclical manner are provided with a time stamp by the PC. However, data are not collected in a clock-synchronous manner, in the particular time domains of the automation system, across the individual subsystems, e.g., hardware and software, or, particularly, in different time domains, e.g., at the level of block preparation and processing, as is the case with NC. Due to procedures of this type, time fluctuations of up to one second are unavoidable in typical applications. Furthermore, brief processes that last less than one second cannot be reliably registered.

SUMMARY OF THE INVENTION

The object of the present invention is to enable automation systems to record data in a clock-synchronous manner across various time domains and subsystems. A particular object of the present invention is to enable visualization of the relevant data, to provide an overview of the clock times. A further object is to enable the clock-synchronous visualization of the recorded data with regard for clock time, process, and/or machine optimization.

To this end, the present invention provides an automation system with a method for cycle time, process, and/or machine optimization that has the features of the independent claims. Advantageous designs are the subject of the subclaims and the description below.

According to the present invention, clock-synchronous data recording across the various time domains of the CNC of an automation system, e.g., at the levels of block preparation and processing, is provided. This makes it possible, in particular, to visualize the collected data in manner such that they are related to each other in terms of time. This therefore makes it possible, according to the present invention, to display—with µs accuracy—the interpretation time, the block preparation time, the block processing time (and, therefore, the time between block preparation and block execution), and relevant, clock time-influencing processes on the NC, SPC or a drive (e.g., the acceleration/braking phases in the form of current axle acceleration and/or motor current). The user is therefore enabled to relate the individual processes in the automation system to each other, and particularly to the overall process (e.g., the NC program), with µs accuracy.

According to the present invention, using the tool makes it possible to quickly determine which subprocess has potential for improvement in terms of clock times. Furthermore, more exact analyses are made possible, by incorporating further data in different time domains and in the particular subsystems, including their clock-synchronous depiction.

The automation system advantageously includes means for visualizing the cycle times that were determined. Using a visualization of this type, a programmer, start-up operator, or machine operator of the system can determine particularly easily where there is potential for savings, and at which points optimizations are possible.

Means are advantageously provided for regularly or selectively acting upon and/or querying the clock time-registering means. By selectively or regularly providing data with the associated clock times, the individual optimization steps can easily be checked for effectiveness at start-up. In the same manner, it can also be determined—during subsequent operation of the automation system—whether the effectiveness has dropped off over time. It is also possible to incorporate findings obtained during operation of the automation system in a subsequent registration of clock time.

Particularly advantageously, the internal and/or external subsystems include drive, SPC, NC, and/or robotic control (RC) systems. The inventive coordination of systems of this type results in a particularly great potential for savings.

Advantageously, the clock time-registering means are designed as internal clocks that are synchronized with each other above and beyond the individual subsystems (hardware limits). Clocks of this type are typically included in automation systems, but they are not synchronized with each other. As a result, events that take place in the various subsystems are detected with µs accuracy, but they cannot be related to each other directly with µs accuracy.

Further advantages and embodiments of the present invention result from the description and the attached drawing.

It is understood that the features mentioned above and to be described below can be used not only in the combination described, but also in other combinations or alone, without leaving the framework of the present invention.

The present invention is depicted schematically with reference to an exemplary embodiment in the drawing, and it is described in detail below with reference to the drawing.

DESCRIPTION OF THE PREFERRED EMBODIMENTS

Figure 1:
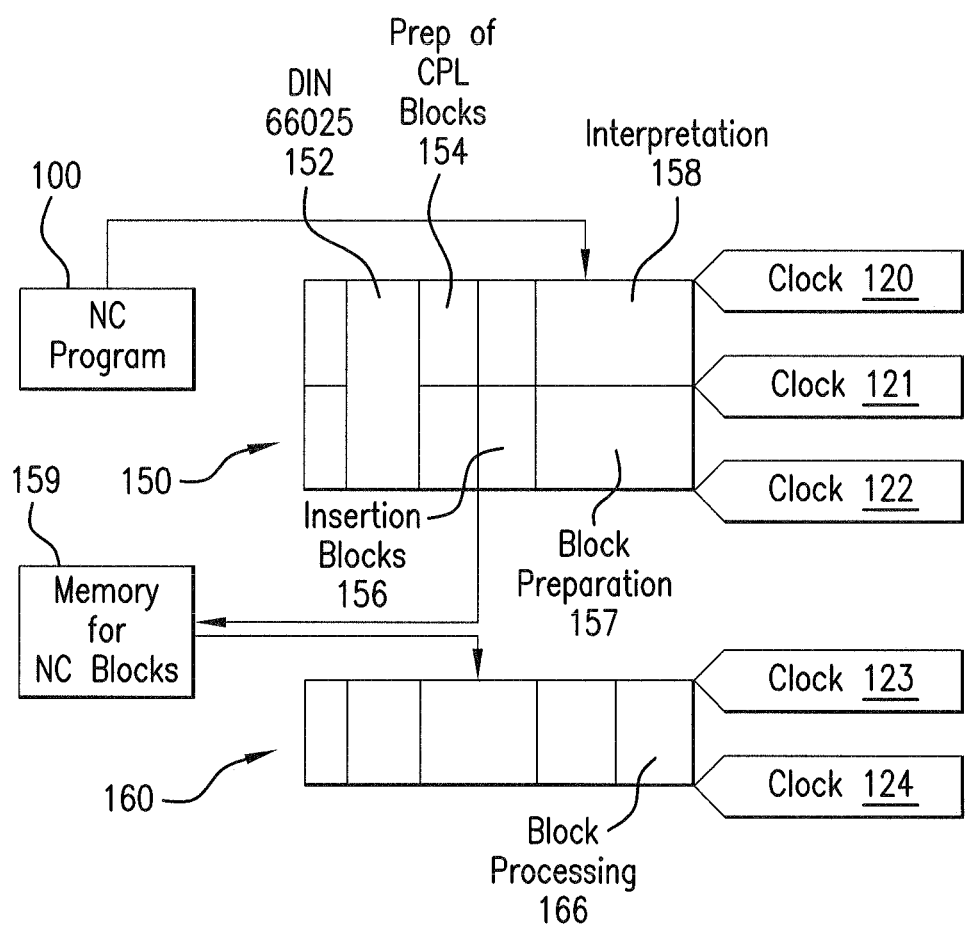
FIG. 1 shows a block diagram that explains a preferred embodiment of the inventive clock time, process, and/or machine optimization.

FIG. 1 describes the basic principle of a computerized numerical control (CNC). The NC program in a not-shown CNC is depicted schematically and labeled with reference numeral 100. When NC program 100 is called up by the controller, the program is loaded from memory into a random access memory (RAM) in a manner known per se. The NC program provides, e.g., a process for a robotic system.

The data loaded in the RAM are first subjected to an SAV block preparation, which is labeled with reference numeral 150. Block preparation 150 is a first time domain of the NC program, which typically takes place within milliseconds. The object of block preparation 150 is to prepare data provided by NC program 100. It must be possible—by using these prepared NC data blocks—to realize an interpolator operation IPO (labeled with reference numeral 160), which takes place within milliseconds or in real time. Interpolator operation 160 is a second time domain within the overall system. It should be noted that this rough subdivision into two time domains serves merely to illustrate the present invention. Actual systems can include a large number of domains of this type, as depicted below with reference to FIG. 3.

Typical applications and/or preparations within the framework of block preparation 150 include acting upon the data of NC program 100 with basic command blocks and/or motion commands, e.g., according to DIN 66025 (reference numeral 152). Furthermore, the customer programming language (CPL blocks) can be prepared here (depicted as reference numeral 154). Insertion blocks (labeled with reference numeral 156) insert the block preparation, e.g., when tool radius correction is switched on and the machine is moved around a corner. In this case, the block preparation inserts a segment of a circle as the intermediate block.

Block preparation 150 includes, overall, an interpretation 158 of the data received from NC program 100, and block preparation 157. Interpretation and block preparation can take place in parallel to a certain extent. It is also possible, however, to carry out block preparation 157 after interpretation 158 ends.

Using internal clocks 120 through 124 that are synchronized with each other and that are provided in a computer in which NC program 100 runs, time stamps are generated, e.g., at the beginning of the interpretation (using clock 120), at the end of interpretation (using clock 121) (this point in time can coincide with the beginning of block preparation), and at the end of block preparation (using clock 122). Using this time stamp, it is possible to easily monitor the NC program in terms of time and function, as well as all subprocesses that influence this overall process, e.g., the acceleration phase of a drive, or the switching of a hydraulic valve for opening a tool gripper, as described below.

As mentioned above, the data and/or data blocks generated within the framework of block preparation are processed in interpolator device 160 (step 166). In this case as well, the start of interpolation (using clock 123) and the end of interpolation (using clock 124) are registered in terms of time, preferably using time stamps generated by synchronized clocks.

The data generated within the framework of block preparation and processing can be stored for the interim in a memory for prepared NC blocks (depicted schematically in FIG. 1 and labeled with reference numeral 159).

Based on the time stamps that were registered, it is possible to easily optimize the overall process (e.g., an NC program for manufacturing a rotary part), as will now be explained with reference to FIG. 2 as an example. This is a visualization—according to the present invention—of the particular clock times that were registered (e.g., via the time stamps). Using related dialogs, the user pre-selects the data to be recorded, stored, and subsequently visualized.

It should be noted that row N_S1 refers to the rotational speed of a spindle, as an example. The second row Mom_X1 depicts the torque of an axle. The remaining rows refer to programs or subprograms, e.g., for automatically rotating a bearing receptacle.

The "PROG" row is, e.g., the main program (NC program), which calls up related subprograms, e.g., M6, which initiates a tool change. Further subprograms and/or variables are labeled with further abbreviations CPL (mentioned above), NC (NC block), Hifu (help functions for rapid data exchange between NC and SPC, i.e., stored-program control), Var_1 (variable of NC), Var_A (variable of SPC) and Ch_Ena (interface signals between NC and SPC). Using a cursor 200, which is displaceable, e.g., continually along the particular row, it is possible to obtain a comparative view of the clock times and/or control times in the individual rows. A further cursor could be used, e.g., as a measurement cursor, e.g., to measure times of a certain procedure relative to the overall process, e.g., the acceleration phase of a drive at the beginning of a certain processing sequence.

The NC blocks are depicted in the NC row. Note here that NC block N0010 last for a relatively long time. It could now be checked, e.g., whether the execution time of this block could be reduced by setting an early channel release (Ch_Ena on the SPC). In the same manner, the instantaneous course appears to not be optimal in block N0120 (see, FIG. 2, Mom_X1). Next, the acceleration torque of the axle in the run-up and braking phase will be investigated in greater detail. Further potential for savings can be attained, e.g., with spindle run-up (N_S1). Savings can also be gained by further investigating the subprocesses triggered via help functions M40, M71 and M88. Process M71 "Open tool gripper" could possibly be set somewhat sooner on the SPC after specific monitoring steps are carried out; the triggering of the hydraulic valve to open a tool gripper would therefore require somewhat less productive time. Another possibility is for help function M71 to output an NC block at an earlier point in time.

Figure 2:
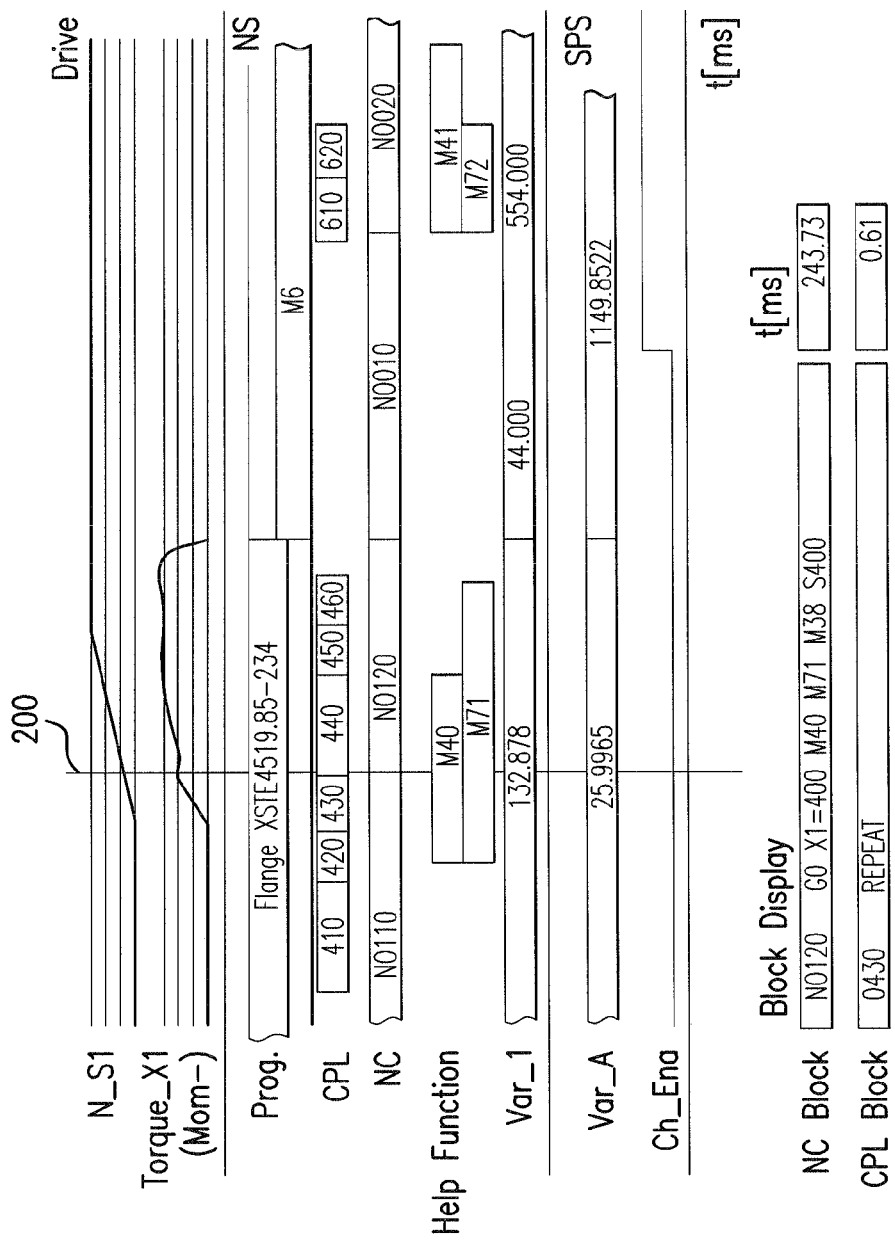
FIG. 2 shows a preferred embodiment of a visualization—that can be used within the framework of the present invention—of the data (signals) that were determined, with time reference to the particular NC blocks of the NC program.

The NC block or CPL block selected using the cursor is displayed, together with the particular execution time, at the bottom of FIG. 2. In the example, this is NC block "G0 X1=400 M40, M71, M88, S400" with an execution time of 243.73 ms, and a CPL block "REPEAT", with 0.61 ms.

Another important application of clock time analysis is process and machine optimization. For example, the machine resilience during machining (above and beyond the entire machining process, if necessary) can be recorded, stored, displayed, evaluated, and optimized if necessary, by utilizing simultaneous recording by the motor sensor and the external sensor.

Figure 3:
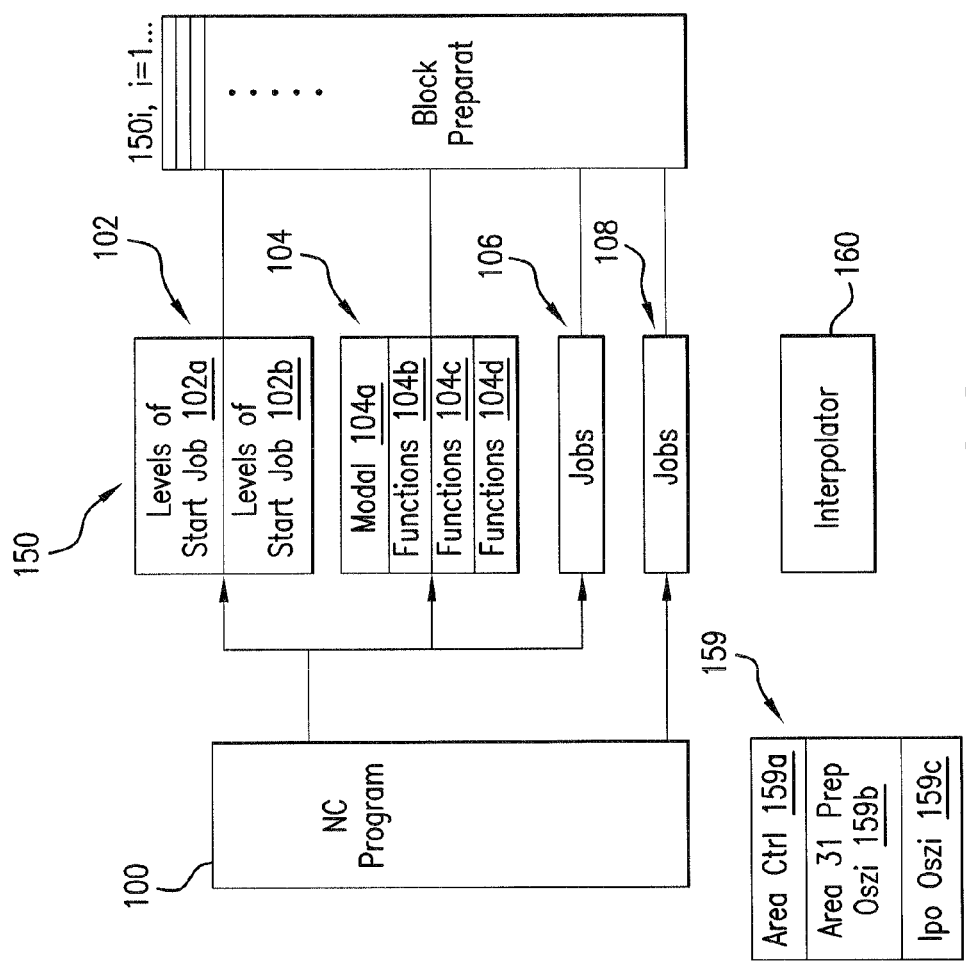
FIG. 3 shows a further block diagram for depicting further aspects of the present invention.

FIG. 3 shows a possible internal realization on the NC in greater detail. In particular, this figure serves to illustrate the numerous control domains that occur in practice (time domains: tasks, sections, functions); particularly at the level of block preparation 150, block processing 166, and interpolator 160.

The following are linked with each NC function:
Start jobs 102, which are processed only once, when the related NC function is called up;
Modal jobs 104, which are called up anew (until they are removed via a further NC command) every time a new NC block is read in, and
Exit jobs, which are processed once, when the related function is deselected.

Recording can be switched on using a command in NC program 100, e.g., OSC(1), or using a suitable, not-shown interface, using a button. As soon as a command to record NC blocks and/or block-based or non-block-based signals (including corresponding trigger conditions) is issued by a subsystem of the control system, the NC activates—with reference to the data (signals) specified (to be recorded) by the user—the required start (102), modal (104) and exit jobs (106) to record the data at the various levels of the control system.

In a start job (with functionalities OscOnStart and OscOnIpoBlk), the preparations required for the recording operation, e.g., request from memory, or the address calculations for the data to be recorded are carried out. The various levels and/or functionalities of start job 102 are depicted schematically, and they are labeled with reference numerals 102a and 102b.

A few modal functions that are relevant for the recording operation (OscPrep, SaveBlkData, OscEndOfPrep and Osc-Parser), i.e, 104a through 104d of modal job 104, are shown in FIG. 3. They record the data selected by the user within the various levels of block preparation 150, block processing 166, and interpolator 160 (and in the remaining subsystems such as SPC and drive, if necessary), including the associated time stamps, using synchronized clocks (not shown in FIG. 3). In this manner, e.g., at the block preparation level of the particular NC block, the particular subprogram, the active subprogram levels, the axle positions in workpiece coordinates; and, at the block processing level, the line speed, and at the interpolator level the current axle speed are all recorded with the associated time stamp.

When the recording operation has ended, the NC performs exit job (106) OscOffIpoBlk, which releases, e.g., the temporary memory.

Recording is halted using the NC command OSC ( ) or a suitable, not-shown interface, using a button. To this end, the NC carries out a further start job 108 OscOffStart and removes modal jobs 104 in particular.

Using various jobs 102 through 108, e.g., internal block memories can be requested, and addresses, such as the channel, axle and spindle interface between NC and SPC, or tokens for permanent CPL variables or Sercos data can be determined.

The memory (159) is shown in the bottom left corner of FIG. 3. An area Ctrl (reference numeral 159a) is used to configure the recording operation, e.g., to specify signals or the time frame in which the signals and data are to be recorded. An area BIPrepOszi (159b) represents for the memory, in which the data and signals registered at block preparation levels are stored. The data and signals occurring at the interpolator are stored under IpoOszi (159c). The two latter memories can also be realized in the form of an alternating buffer, so that larger quantities of data can be recorded at a high sampling rate within the NC over longer periods of time.

Further systems involved in a recording operation are connected via the forwarding of the trigger signal between the systems. Clocks that are synchronized with each other across the subsystem boundaries are an essential prerequisite for clock-synchronous recording to be carried out across the subsystems.

In all, according to the present invention, a tool is provided that can be used to record, store, administer and prepare clock time-relevant data, and to depict them graphically in highly diverse manners. As bar charts or pie charts, for instance. According to the present invention, a very high level of accuracy of time registration is realized, Data in all time domains of the control can therefore be registered and recorded (not just IPO data). A time-based reference can therefore be provided across all time domains, particularly using synchronized clocks in the total system, and it can be visualized graphically. Recorded block information and other recorded data and signals from the various control levels can therefore be displayed in a clock-synchronous manner. A clock-synchronous, graphical processing simulation can be used as necessary; it can include the option to scroll through blocks forward or backward, for example.

It will be understood that each of the elements described above, or two or more together, may also find a useful application in other types of systems and methods differing from the type described above.

While the invention has been illustrated and described as embodied in an automation system and method for clock time, processor, and/or machine optimization, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. An automation system with computerized numerical control, comprising:
    at least two data processing levels, each data processing level having a time domain and at least one subsystem;
    at least one clock time-registering means assigned to each of the at least two data processing levels and configured to register clock times of the subsystems of the at least two data processing levels with respect to the time domains of the at least two data processing levels, each clock time-registering means being configured to operate synchronously with each other clock time-registering means, each clock time-registering means being configured to store the clock times in an alternating buffer;
    means for comparing the clock times and relating them to each other in terms of time for the at least two data processing levels; and
    means for graphic and clock-synchronous visualization with microsecond accuracy of said clock times that were registered, wherein said clock times are arranged in a comparative view in said visualization,
    wherein said subsystems include systems selected from the group consisting of drive systems, Statistical Process Control (SPC) systems, Numerical Control (NC) systems, robotic control (RC) systems, and combinations thereof.

2. An automation system as defined in claim 1, further comprising means for acting upon the clock time-registering means such that clock times can be registered anew, in a manner selected from the group consisting of regularly acting and selectively acting.

3. An automation system as defined in claim 1, further comprising means for querying the clock time-registering means such that clock times can be registered anew, in a manner selected from the group consisting of regularly querying and selectively querying.

4. An automation system as defined in claim 1, wherein said clock times include interpretation times, block preparation times, and interpolation times.

5. An automation system as defined in claim 1, wherein the at least two data processing levels are a data block preparation level and a data block processing level.

6. A method for optimizing an automation system having at least two data processing levels, each data processing level having a time domain and at least one subsystem, the method comprising:
    assigning clock times to the subsystems of the at least two data processing levels with respect to the time domains of the at least two data processing levels;
    registering the clock times assigned to the at least two data processing levels using clock time-registering means assigned to each of the at least two data processing levels, each clock time-registering means being configured to operate synchronously with each other clock time-registering means, each clock time-registering means being configured to store the clock times in an alternating buffer;
    comparing the clock times registered for the data processing levels with each other and relating to each other in terms of time; and
    graphically visualizing with microsecond accuracy the clock times that were registered in a graphic and clock-synchronous visualization, wherein said clock times are arranged in a comparative view in said visualization,
    wherein said subsystems include systems selected from the group consisting of drive systems, Statistical Process Control (SPC) systems, Numerical Control (NC) systems, robotic control (RC) systems, and combinations thereof.

7. A method as defined in claim 6, wherein the at least two data processing levels include a data block preparation level and a data block processing level.

8. A method as defined in claim 6, further comprising registering the clock times anew in a manner selected from the group consisting of regularly and selectively.

\* \* \* \* \*